United States Patent [19]
Clark et al.

[11] Patent Number: 4,628,584
[45] Date of Patent: Dec. 16, 1986

[54] METHOD OF REMOVING FIBERS PROTRUDING INTO BORES

[75] Inventors: George B. Clark, Clayton; Clayton K. Maidre, Pittsburg, both of Calif.

[73] Assignee: The Dow Chemical Company, Midland, Mich.

[21] Appl. No.: 695,973

[22] Filed: Jan. 28, 1985

[51] Int. Cl.[4] .................. B23P 13/04; B23B 51/06
[52] U.S. Cl. .................. 29/557; 82/DIG. 1;
210/321.1; 210/323.2; 408/1 R; 408/57; 409/136
[58] Field of Search ............ 29/557, 558, 650, 33 R, 29/33.7; 409/136, 137, 139, 131, 140, 249, 244, 293; 408/1 R, 19, 57, 58, 59; 82/1 C, DIG. 1; 210/321.1, 323.2; 55/158

[56] References Cited

U.S. PATENT DOCUMENTS

| | | | |
|---|---|---|---|
| 308,889 | 12/1884 | Gallup | 82/DIG. 1 |
| 2,670,528 | 3/1954 | Brunberg | 29/557 |
| 3,078,560 | 2/1963 | Vosburg | 82/DIG. 1 |
| 3,287,998 | 11/1966 | Goerner et al. | 408/59 |
| 3,304,815 | 2/1967 | Faber | 408/59 |
| 3,570,332 | 3/1971 | Beake | 82/1 C |
| 3,696,504 | 10/1972 | Cupler, II | 29/558 |
| 3,739,461 | 6/1973 | Cupler, II | 408/1 X |
| 3,767,315 | 10/1973 | Burks | 408/59 |
| 4,036,308 | 7/1977 | Dellenberg | 408/58 X |
| 4,061,574 | 12/1977 | Clark | 210/321.1 |
| 4,080,296 | 3/1978 | Clark | 210/321.1 |
| 4,113,405 | 9/1978 | Dillinger | 408/57 X |
| 4,168,925 | 9/1979 | Dufresne | 408/59 |
| 4,369,605 | 1/1983 | Opersteny et al. | 51/319 |

FOREIGN PATENT DOCUMENTS

| | | | |
|---|---|---|---|
| 202701 | 11/1983 | Japan | 82/DIG. 1 |
| 642088 | 1/1979 | U.S.S.R. | 408/19 |

OTHER PUBLICATIONS

Article "Sub-Zero Machining", Metalworking Production 10-5-60, by F. A. Monahan.
Machine Tool Practices, pp. 353, 386, 388, 389, 564, J. Wiley & Sons., N.Y, publ. 1979.
"Brookstone" Catalog, p. 30, Brookstone Co., Fall 1984.
Valenite Brochure, "Two-Tube Deep Hole Drilling System", GTE Valeron Corp., Aug. 1984.

*Primary Examiner*—William R. Briggs
*Attorney, Agent, or Firm*—Robert R. Stringham

[57] ABSTRACT

The walls of bores made in tubesheet/hollow fiber composite structures are trimmed, and the bores may be enlarged, by use of a rotating, generally tubular tool comprising a cutting head with outwardly extending portions of lands terminating in teeth having cutting edges generally parallel to the central axis of the tool. The lands are separated by ports in the tool wall which communicate with the hollow interior of the tool. The trimmings formed are deflected by the teeth into a flow of sweep gas passing through the interior of the tool. The operation is facilitated by flash-freezing of any portions of the generally softer fibers exposed and protruding into the bore or across the mouths of the fiber lumens.

18 Claims, 10 Drawing Figures

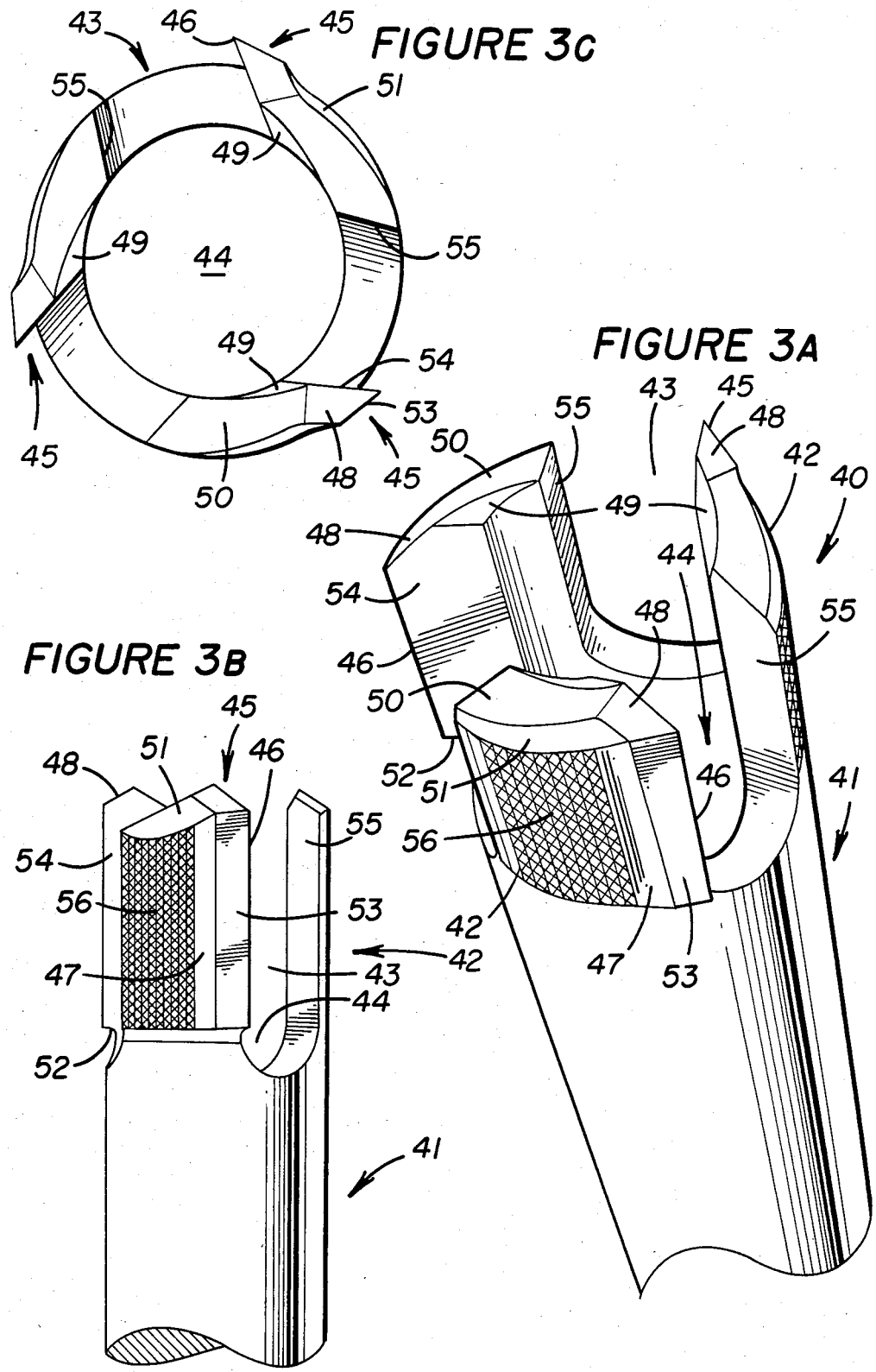

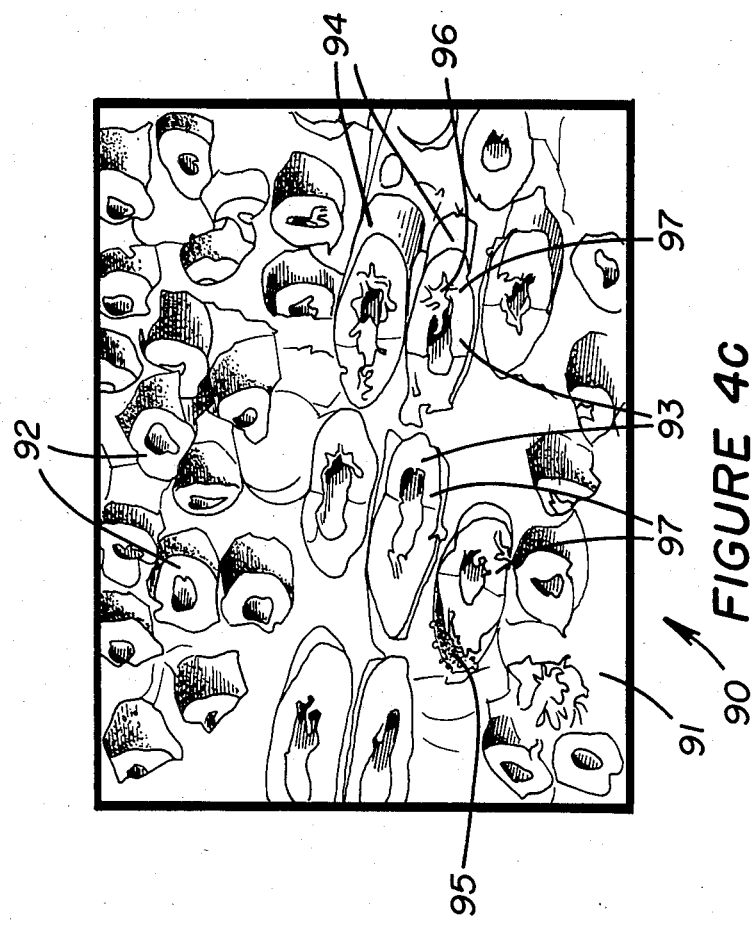

METHOD OF REMOVING FIBERS PROTRUDING INTO BORES

BACKGROUND OF THE INVENTION

The present invention was made in the course of a United States Government Contract, OWRT Contract No. 14-34-0001-0501.

U.S. Pat. Nos. 3,475,331, 4,061,574 and 4,080,296 disclose permeability separatory devices in which the membrane takes the form of a large number of hollow fibers which pass in sealing engagement through at least one resinous wall member ("tubesheet"). In one mode of operation of such devices, a feed liquid, such as saline water, is applied under pressure to the outer surfaces of the fibers and one or more fluid components of the feed, such as water, to which the fiber walls are selectively permeable, pass through them into the fiber lumens. The permeate is collected from the fibers by flow therefrom into bores through the tubesheet (and the "potted" portions of the fibers) which communicate with a discharge conduit. The bores have been formed simply by drilling into the tubesheet with a twist drill.

It has been found that the latter method of forming the bores results in at least partial blockage of a substantial proportion of the fiber lumens. Microscopic examination has shown that this is due to "smearing" across the fiber mouth of the fiber material—which is generally softer than the tubesheet material. That is, the drill does not cleanly "flush-cut" the fibers. Consequently, the prior art method of drilling results in lower than anticipated permeate productivities. In scaled-up devices, such as those contemplated in the '296 patent, the absolute decrease in product rate can amount to thousands of gallons per day.

Essentially the same "smearing" problem has been experienced when hollow fibers potted in a tubesheet are opened by cutting off the end of the tubesheet. The several prior art solutions to this problem are reviewed in U.S. Pat. No. 4,369,605. Of these solutions, the two most relevant to the present invention are disclosed in U.S. Pat. Nos. 3,503,288 and 4,183,283; both comprise "trimming" a pre-cut tubesheet face with a rigid cutting tool or knife.

Passage of fluids (as coolants, lubricants and/or flushes) into a bore through the drill and out through the space between the bore wall and the drill is known for a variety of drilling operations. However, the use of water in this manner when boring into epoxy tubesheet/cellulose ester hollow fiber assemblies with several varieties of conventional tools was found unsatisfactory for the purposes of the present invention.

OBJECTS OF THE INVENTION

The primary object of the present invention is to provide a method of boring tubesheet/hollow fiber composite structures whereby only minimal or nil lumen blockage results.

An additional object is to provide bored tubesheet/hollow fiber composite structures offering less resistance to flow of fluids through the fibers into the bores and vice versa.

A further object is to provide hollow fiber, drilled tubesheet-type permeatory separatory devices which are not productivity-limited by lumen blockage.

A corollary object is to provide a tool and method for opening fiber lumens which have become at least partially blocked during the drilling of holes through hollow fiber/tubesheet composite structures.

A broader object is to provide a tool and method by which solid or hollow bulges, whiskers, fiber lengths or loops consisting of a material softer than that generally defining a bore and protruding from the wall of the bore can be removed to leave a bore (of the same or larger diameter) having a generally smooth surface.

It is also an object to provide a method of smoothing the wall surfaces of deep, well-like bores in soft materials which eliminates piling-up, gumming, burning or seizing of or by detritus in the waste-conveying spaces between the flutes of twist drills, the teeth of reamers and/or a tool and the wall of a bore.

Still other objects will be made apparent to those knowledgeable in the art by the following specifications and claims.

BRIEF DESCRIPTION OF THE DRAWINGS

FIGS. 1, 2 and 3 are perspective views of three different versions of the trimming tool of the present invention, each including an enlarged view of the cutting head or "working end" of the tool depicted.

FIGS. 4A, 4B and 4C are depictions, based on scanning electron micrographs, of three drill hole wall sections. 4A and 4B represent vertically spaced apart sections of the wall of a single hole made with an ordinary twist drill in an epoxy tubesheet/cellulose ester hollow fiber composite structure and trimmed to only half its depth by the present method—including freezing of the fiber flaps. FIG. 4A represents the untrimmed section and 4B the trimmed section. FIG. 4C represents a typical section of the wall of a hole in a comparable tubesheet/hollow fiber structure trimmed by the present method without embrittling the soft fiber flaps.

SUMMARY OF THE INVENTION

Figures 1A, 1B:
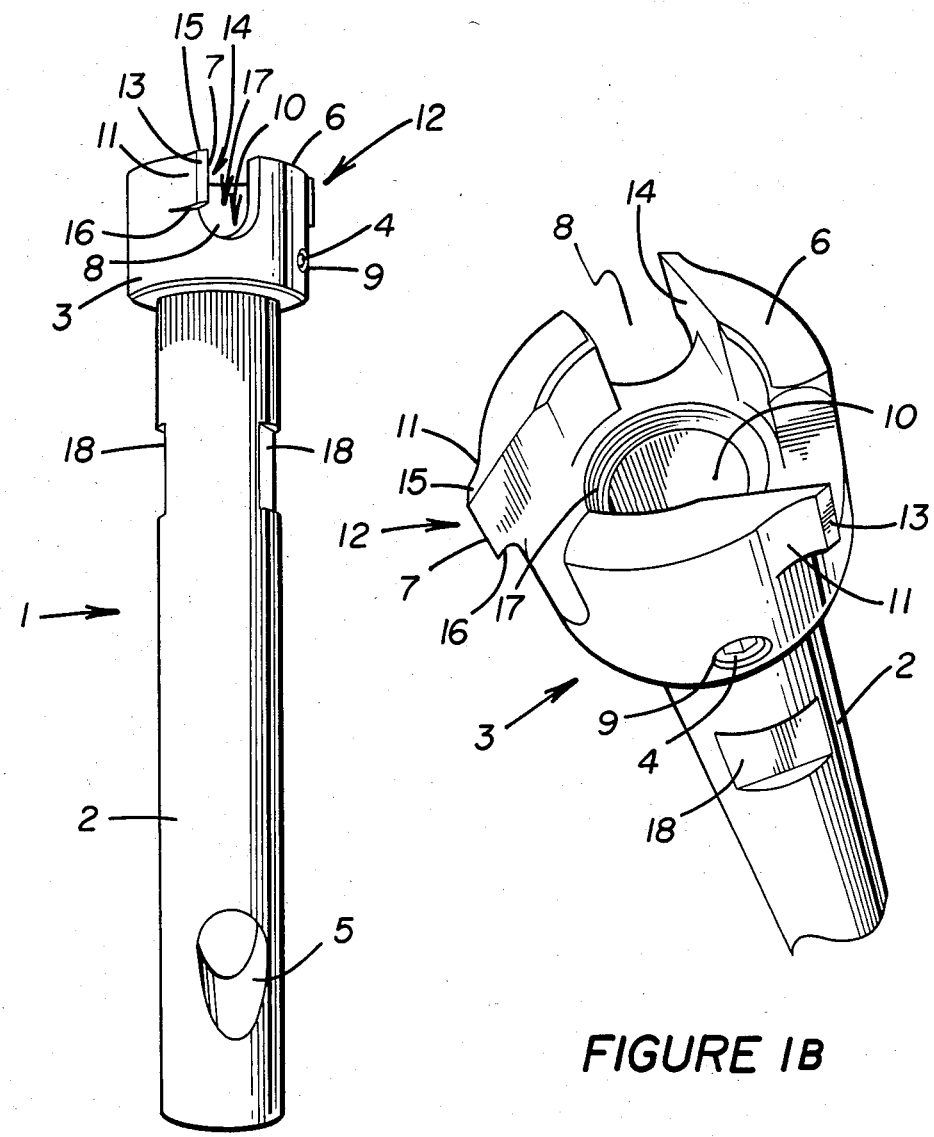

In its broadest aspect, the present invention may be defined as:

A method of trimming the wall surface of a generally cylindrical, first bore extending into a solid body, one or more portions of said surface being defined by appendages adhered to or integral with and extending from said body into said bore or across the mouths of one or more other bores intersecting said first bore, said method comprising:

(1) as may be necessary, hardening or embrittling said appendages, (2) advancing into said bore a rotating trimming tool having a generally tubular shank and a cutting head attached to or integral with said shank, said head having a cutting edge and being adapted to
  a. convert said appendages to cuttings,
  b. permit flow of a sweep fluid into said shank, and
  c. deflect said cuttings into said flow,
and (3) causing said fluid to flow into said tool and out through said shank at a sufficient velocity to carry out said cuttings.

Preferably, the "first bore" has been formed with a single flute, twist drill (the type commonly employed for drilling deep or long holes in soft materials, such as wood).

The tool employed in the foregoing method embodies the combination of a hollow shank and an attached or integral, open- or closed-ended, generally tubular head having at least one (preferably two; more preferably three) cutting edge(s) at least generally parallel to the central axis of the tool and having an opening adjacent each cutting edge for ingress of a sweep fluid and the cuttings generated. The land which terminates in the cutting edge is shaped to provide relief for the cutting edge and to effect the required deflection of the cuttings into the flow path of the sweep fluid. The shortest radial distances from the central axis of the tool to the cutting edges of course are longer than the radii of the other elements of the tool.

The advantages of the present boring method are most apparent when the body defining the "first bore" is a composite comprising relatively soft, plastic hollow fibers potted in a body of a harder, thermoset, resinous tubesheet material. In this case, the fiber lumens constitute the "other bores" intersecting the first bore and the "appendages" consist of unsevered, no longer potted portions of the fiber walls, projecting into the main bore or extending as "flaps" across the mouths of the fibers they are part of. Hardening or embrittling of these soft appendages, as—for example—by "flash-freezing", is essential to their removal by the present method.

In the best mode of practise now known, embrittlement is initiated (and maintained) by use of a chilled sweep fluid during trimming. (Chilling prior to commencement of trimming works well but is less time-efficient.)

For convenience, the tool used may be referred to simply as a "trimmer", although it may accomplish at least one of the functions of tools commonly designated as reamers. Such enlargement of the bore as results may be essential or merely incidental to the requisite facing, shaving or trimming, i.e., removing any portions of bumps, fibers or adhered globs extending into the bore in such a manner as to undesirably effect the intended function of the bore or the bored body.

The trimmer may be more precisely defined as a generally cylindrical tube, so worked or fabricated at or proximal to one end—which may be open or closed—as to (1) define or comprise one or more radially protruding cutting lips or blades, and (2) define an opening through the tube wall adjacent to each of said lips or blades and bounded on one side by the cutting edge of that lip or blade, said lip(s) being shaped so that the waste generated, when said tool is rotated about the center axis of said tube and advanced into a bore of the same or smaller diameter is directed or impelled by the rotary motion of the lip(s) or blade(s) inwardly through said opening into the interior of the tube.

DETAILED DESCRIPTION

*Bored bodies* suitable for the practise of the invention.

The method of the present invention is uniquely suitable for reopening fiber lumens which have become at least partially blocked during drilling into hollow fiber/tubesheet assemblies. However, the method is believed applicable to removal of materials tenaciously adhered to or integral with the walls of bores through solid bodies in general. This is particularly so when the material to be removed is so plastic or rubbery as to readily clog conventional drills or reamers or deform instead of being cut.

The tubesheet resins in which hollow fibers are potted will generally be cured to a hard, rigid condition. The fibers will usually be softer than the cured potting resin but, in any event, if the difference in hardness between the fibers and the resin or the particular natures of the two materials per se are such in any regards that conventional reaming or boring methods result in any substantial degree of lumen blockage, practice of the present invention is indicated. This is particularly the case when the mixed shavings or chips of the resin and fibers have a greater tendency to gum, pack or lock conventional tools than would either type of waste alone (even if a lubricant and/or coolant is fed through the tool employed).

The potting resins most widely used in hollow fiber permeators are epoxies and the most often used fibers consist of cellulose esters; cellulose acetates most notably. However, other thermosets (or even some thermoplastics) may be employed as potting resins. A wide variety of relatively soft materials have been used to make hollow fibers, mostly permselective but not necessarily so; essentially impermeable fibers prepared from polytetrafluoroethylene (etc.), have been used in hollow fiber type heat exchangers.

Whether or not any advantage may be realized by practice of the present invention with any particular potting resin/fiber (or wall material/adhered material) combination can readily be determined. That is, a test specimen (tubesheet/fiber assembly, or whatever), large enough to accommodate a number of bores, can be made and drilled by as many types of drills as appear to be suitable, then reamed, bored or trimmed—as per the present invention, to about ½ depth, then carefully sectioned. The different sections are then compared with optical or electron microscopes. (See FIGS. 4A and 4B of the drawings herein.)

PRE-DRILLING

The hole whose walls are to be "faced", "dressed" or trimmed may be formed in the hollow fiber/tubesheet composite structure (simply "tubesheet" hereafter) by any suitable method but preferably is formed by means of a conventional, single flute, twist drill of the type commonly used for drilling deep or long holes in wood. That is, the (twisted) point of the drill, illuminated to cast a shadow of maximum area, projects a silhouette which approximates an equilateral triangle, the flute edge is highly sharpened throughout the length of the twist and the radius of the land terminating in the flute edge is greater than the radius of the rest of the drill.

It has been found that the drill may be rotated at such a rate and under such longitudinal pressure as to advance into the tubesheet at a relatively rapid rate. Slower drilling has not resulted in any substantial improvement as to the need for subsequent trimming of the resulting hole surface (at least when drilling into a tubesheet consisting of a cured body of an epoxy resin in which cellulose ester hollow fibers are potted).

The pre-drilling of course may be carried out with the aid of a fluid which is fed through the tool used and lubricates, removes drilling heat and/or sweeps out waste around the outside of the tool.

TRIMMING

The tubular trimming tool of the present invention must be adapted to: (a), cut off the material to be removed from the hole walls; (b), deflect the cuttings toward the interior bore of the tool; (c), permit flow of a sweep fluid between the hole wall and the exterior surface of the tool and, together with the deflected cuttings, into and out through the interior bore of the tool; and (d), be connectable to a driving means (such as a drill chuck, for example).

The head or cutting means by which function (a) is accomplished comprises at least one, preferably two or more, edge-sharpened lips which may be formed simply by shaping an end portion of a monobodied tool or may be formed from a separate body of metal which is joined (preferably removably) to the rest of the tool. Function (b) is accomplished by the shapes of the lips and the presence of an opening through the tool wall adjacent to the cutting edge of each lip. Funtion (c) is accomplished by the sizing of the tool above the lips (i.e., of the shank), by the openings through the tool wall, by the interior bore of the tool and by virtue of the shank being designed so that the flow of cuttings-laden sweep fluid out of the tool is not unduly hindered by the means employed to drive the tool.

Ordinarily, the tool will also be adapted (as by the greater diameter of the cutting circle than of the shank and appropriate relief in the portion of the land culminating in the cutting edge) to enlarge the bore, i.e., to remove a portion of the body defining the bore surface.

The sweep fluid may be a liquid, a vapor or—preferably—a gas and may be made to flow into the hole around the drill, etc., by being under a positive pressure or by connecting the interior bore of the tool to a source of "negative" or reduced pressure. The latter expedient is mechanically simpler to accomplish with a rotary tool and is highly preferred.

Such rotary seal means as are required to maintain the pressure differential between the sweep fluid source and the exit from the tool bore may be of any suitable type conventionally employed for such purposes.

Alternatively, the sweep fluid may be introduced at the mouth of the bore, between the bore wall and the tool, or within the bore by egress from one or more bores intersecting it. However, it is essential that whatever mode of introduction selected, an adequate sweep fluid flow velocity must be attainable without establishment of impracticable pressure differentials.

TOOL DETAILS

Referring now to FIGS. 1-3, several versions of the present invention, as embodied in different trimming tools, will be described.

The tool (1) depicted in FIG. 1A consists of a tubular shank (2), having an end portion (not shown) of reduced diameter, a cutting head (3) slip-fitted on the latter end of the shank and locked thereon by a set-screw (4). The shank is angle-bored to define a passageway (5) communicating with the interior of the shank. The cutting head is shaped to define three glands (6), each terminating in a sharpened cutting edge (7), three intervening passageways (8), a threaded set-screw bore (9) and an interior bore (10; not visible in FIG. 1A; see FIG. 1B) communicating with the passageways (8) and with the interior of the shank. Each gland is shaped to provide relief for the cutting edge in the form of a trough (11) of arcuate cross-section. The "tooth" portion (12) of each gland projects outwardly (at an angle) so that the cutting ("drill") radius of the tool is greater than all other radii of the head. Each cutting edge is the line of intersection between external and internal planar surfaces (13 and 14, respectively) of the tooth. The internal surface (not visible in FIG. 1A; see FIG. 1B) is formed by grinding and can be reground to maintain the sharpness of the cutting edge without disturbing the relief; it has parallel upper and lower edges (15 and 16, respectively). The innermost (interior) surface (17; see FIG. 1B) of the head is adjacent to the upper end of bore (10) and is countersunk. Each lower tooth edge (16) lies on a line parallel to a tangent to the outer circumference of surface (17). Opposed portions of the shank, below the head, are milled to provide flat gripping surfaces (18).

FIG. 1B is an enlarged view of the head (3) and a portion of the shank (2), seen looking downwardly at an angle to the vertical.

When intended for use in cutting cured epoxy tubesheet/hollow fiber assemblies, the head is fabricated from A-2 steel drill rod and air-hardened to a Rockwell number of C57-59 before being ground (sharpened). The manner of fabrication of the tool will be evident from FIGS. 1A and 1B to those knowledgeable in the art.

Figure 2A:
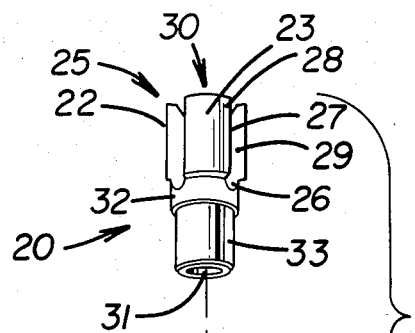

FIG. 2A depicts—in "exploded" view—another two-part type of tool in which a generally tubular cutting head (20)—and a shank (21) are joined by slip-fitting and silver soldering. The head part of this particular tool is more difficult to fabricate and is sharpened by grinding in such manner that the cutting edge (22) loses its vertical relief after being sharpened only a few times. Accordingly, this tool—though fully operable for its intended purpose—is a less preferred embodiment of the invention. Each of the three land portions (23) of the head is much more symmetrical in horizontal cross-section than the lands shown in FIGS. 1A and 1B and the U-shaped passageways (24) between the lands are relatively narrower. The outward extensions of the "tooth" portions (25; not easily distinguished in FIG. 2A; see 2B) of the lands are barely discernible and the cutting radius of the tool is not much larger than the other radii thereof. Accordingly, this trimmer cannot enlarge the bore very much; i.e., has little reaming ability. The cutting edges do not extend fully to the bottoms of the intervening passageways, by reason of notches (26) made to facilitate outward hot-crimping to form the tooth portions (toes) of the lands. Each cutting edge is the line of intersection between an inner planar surface (27)—which is defined by the vertical portion of one wall of the passageway (24)—and a planar, relatively narrow outer surface (28). The opposed vertical portion of the other wall of each passageway (24) is another planar surface (29) defined by the "heel" of the land. The "top" surface (30; see FIG. 2B) of each land is planar and ramped upwardly, proceeding counterclockwise from the heel, at an angle ($\alpha$; about 5°, for example) and is generally a section of an annular surface. Sharpening of the cutting edge is done by grinding surface (28). Passageways (24) communicate with the interior bore (31) extending downwardly through two sections (32, 33) of the head of successively smaller diameter. Section (33) is sized to slip-fit within the upper end of the shank (21) so that the head can be silver-soldered to the shank. It will be seen that the shank includes a lower section (34) of increased diameter which is cut to provide opposed, flat gripping surfaces (35; one shown) and is pierced by an angled bore (36) which communicates with the interior bore through the shank.

Figure 2B:
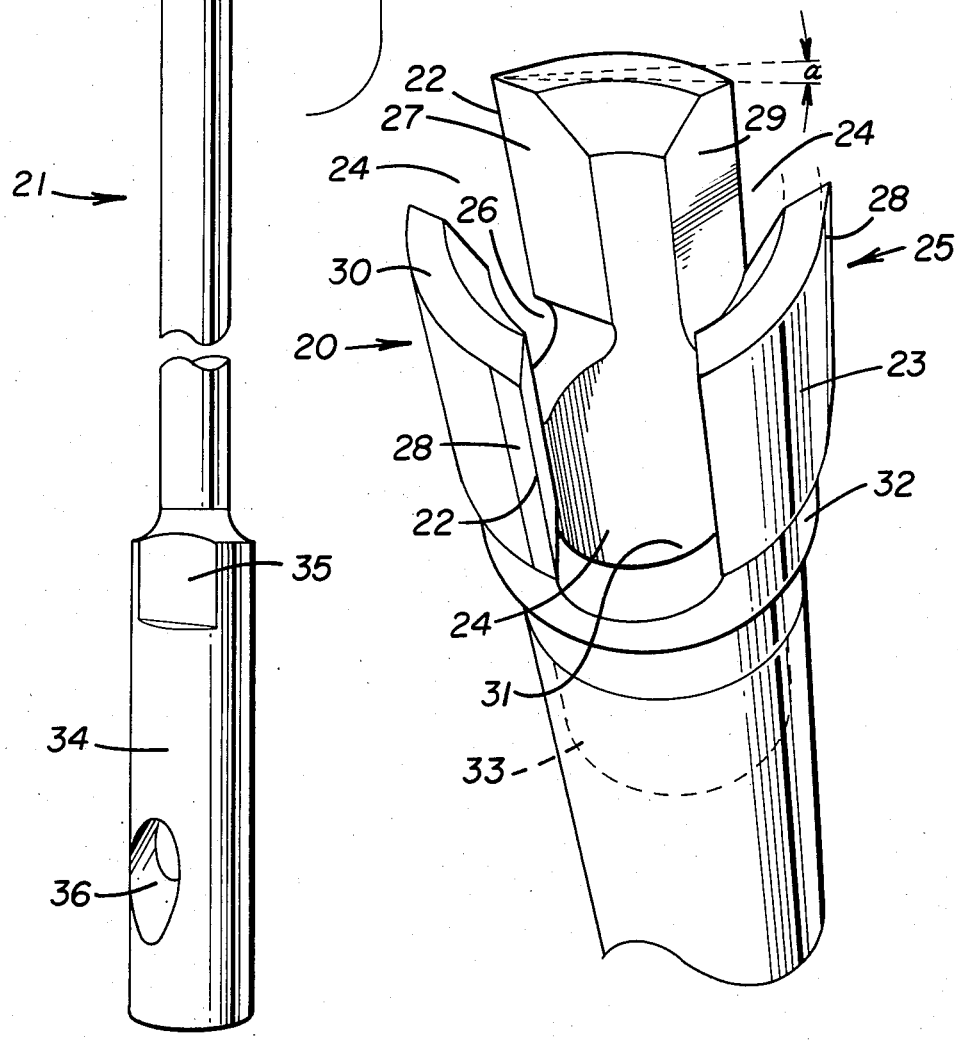

FIG. 2B is a magnified view of the cutting head (20) seen looking downwardly at an angle to the vertical.

Again, the tool is made of A-2 steel drill rod and the head is air-hardened before being sharpened. The manner in which the tool is fabricated will be evident from FIGS. 2A and 2B to those knowledgeable in the art.

The cutting tool depicted in FIGS. 3A, 3B and 3C is presently the most preferred for removal of embrittled fiber material flaps. It is generally similar to the tool depicted in FIGS. 2A and 2B but has substantially more pronounced "teeth". Also the lands have several relief surfaces, are not as thick and can be resharpened repeatedly without loss of relief.

FIG. 3A depicts an oblique, downward view of a generally tubular cutting head (40) and the upper portion of a tubular shank (41) to which the head is joined by slip-fitting and silver soldering. The glands (42), intervening U-shaped passageways (43) and interior bore (44) are closely similar to those of the head depicted in FIG. 2. However, the teeth portions (45) of the glands defining the cutting edges (46) are substantially more pronounced and each is formed in conjunction with a vertical relief concavity (47) and four other generally concave, sloping or bevelled surfaces (48, 49, 50, 51) affording additional relief. Again, the lowermost part of each tooth is cut to define a notch (52) to facilitate outward, hot-crimping of the toe portion of the gland which defines the tooth. Each cutting edge (46) is defined by the line of intersection between a planar outer surface (53) and a planar inner surface (54). The latter surface and an opposed planar surface (55) constitute the side walls of each passageway (43). The convex outer surface (56) connecting each pair of surfaces (47 and 55) is knurled to facilitate gripping.

The cutting radius of the head is substantially larger than any other radius of the tool and the head is capable of substantial reaming. The head consists of A-2 steel drill rod and is air-hardened to C-57-59.

FIG. 3B is an oblique upward view of the head and the upper portion of the shank, depicted in FIG. 3A, and FIG. 3C is an enlarged, end-on view of the head, seen at a slight angle to the vertical.

The manner of fabrication of the head will be made evident to those knowledgeable in the art by FIGS. 3A, B and C.

The entirety of the shank of the tool depicted in FIGS. 3A-C is not shown; the shank is extended simply as a tube of the same shape as the portion that is shown and is not pierced by any bores through the tube wall.

The drive means and sweep fluid educting means ("vacuum takeoff", preferably) employed with various versions of the trimmer tool are of types well known to those versed in the art—such as a combination rotary seal/ball bearing, for example—and are not illustrated.

Figures 4A, 4B:
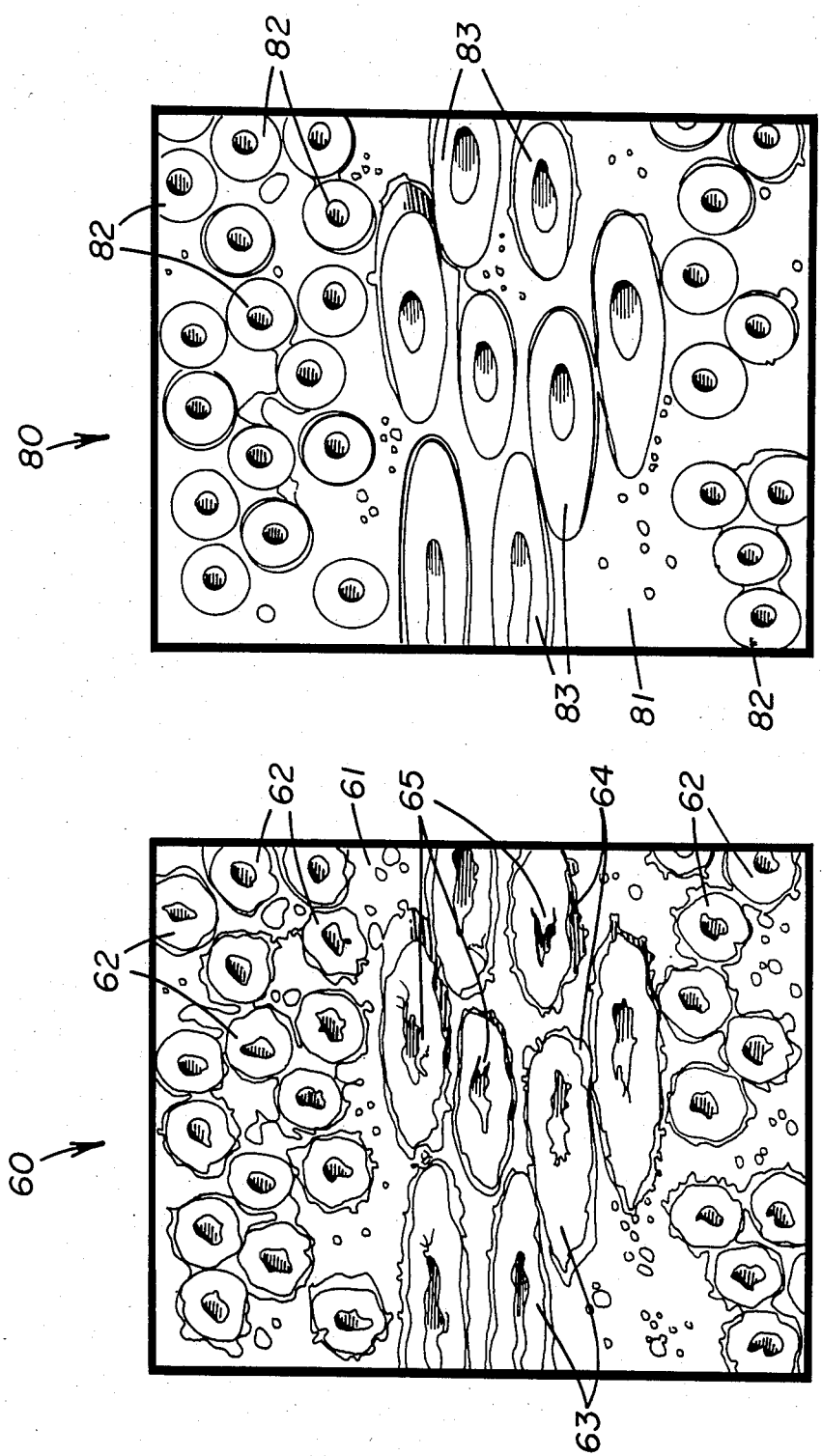

FIGS. 4A-C are discussed in connection with the following example.

COMPARATIVE EXAMPLE

Two separate tests were carried out.

In the first test, a single hole was made with a twist drill in a representative, cured tubesheet/hollow fiber assembly in which the tubesheet resin was an epoxy formulation and the fibers consisted of acetylated cellulose. The hole was then trimmed to about half of its depth with a tool of the type depicted in FIG. 2, immediately after "flash freezing" the wall material by introducing a little liquid nitrogen at the bottom of the hole. Sections of the upper and lower portions of the hole wall were then prepared and examined with a scanning electron microscope. FIGS. 4A and 4B show the lower section (conventional drilling only) and upper section (trimmed by the method of the present invention), respectively.

Turning now to FIG. 4A, the untrimmed section of the wall surface (designated generally by the number 60) is defined by the matrix resin (61), by the cut, generally circular ends (62) of fibers generally perpendicular to the surface and by the cut, generally elliptical ends (63) of obliquely disposed fibers. Gaps (64) between some of the fiber ends and the surrounding matrix resin have resulted from pulling and stretching of the fibers prior to or during cutting by the twist drill. Also, flaps (65) of fiber wall material have been smeared or stretched across some of the fiber lumens (66), thereby at least partially blocking them. Distortion of other of the fiber ends is apparent.

In FIG. 4B, the frozen and trimmed section (designated generally as 80) exhibits essentially no gaps between the matrix resin (81) and either the perpendicular or oblique fiber ends (82 and 83, respectively). Also, essentially no fiber end distortion is apparent.

It will be seen that the untrimmed surface (FIG. 4A) left by conventional drilling resulted in substantial closure of fiber lumens by smeared-across flaps of fiber wall material; clean flush-cutting was not achieved for a significant proportion of the fibers. In contrast, FIG. 4B shows excellent flush cutting with essentially none of the lumen closure and distortion seen in FIG. 4A.

In the second test, two separate (but adjacent) holes were drilled, with a conventional twist drill, in a tubesheet/fiber structure essentially identical to that used for the first test. One hole wall was trimmed, without being frozen, and the other one was frozen before being trimmed. The tool used to trim both holes was of the type shown in FIG. 3.

In FIG. 4C the rough surface (90, generally) formed by trimming without embrittlement is defined by the matrix resin (91), by circular or elliptical fiber end surfaces (92 and 93, respectively), by fiber outer wall surface portions (94) which have been exposed by tearing away of part of the surrounding resin and by generally cylindrical capillary-sized resin surfaces (95) exposed by stretching of fibers prior to cutting followed by retraction ("snapback") of the cut ends. Some flaps (96) and some flattened or "squeezed" ends (97) can also be noted.

The surface of the hole trimmed after freezing was found to be virtually undistinguishable from that of the wall section depicted in FIG. 4B.

It is evident from FIG. 4C that use of a tool capable of substantial reaming (i.e., bore enlargement), to trim a bore surface including non-embrittled appendages of a soft material, gave very poor results. Although not many fiber lumen were substantially occluded by flaps after the trimming operation, "chattering" of the tool head apparently occurred and resulted in a trimmed surface that was considerably rougher than that of the untrimmed bore.

Accordingly, when a bore surface to be trimmed includes appendages of relatively soft materials, at least temporary hardening of those appendages prior to (or during) trimming is highly preferable. However, this does not imply that good results can be obtained only with recourse to freezing or the like when all of the wall materials exposed in a bore (to be trimmed with any of the variants of the tool of the present invention) are relatively hard. (Although chattering can be largely avoided by use of a more rigid drive and vacuum takeoff assembly than was used, embrittlement is still definitely advantageous.)

What is claimed is:

1. A method of trimming the wall surface of a generally cylindrical, first bore extending into a solid body, one or more portions of said surface being defined by appendages adhered to or integral with and extending from said body into said bore or across the mouths of one or more other bores intersecting said first bore, said method comprising:
(1) hardening or embrittling said appendages,
(2) advancing into said bore a rotating trimming tool having a generally tubular shank and a cutting head attached to an integral with said shank, said head having a cutting edge and being adapted to
  a. convert said appendages to cuttings,
  b. permit flow of a sweep fluid into said shank, and
  c. deflect said cuttings into said flow,
(3) causing said fluid to flow into said tool and out through said shank at a sufficient velocity to carry out said cuttings.

2. The method of claim 1 in which said body is a composite of a relatively hard tubesheet resin and relatively soft hollow fibers potted therein and said appendages are flaps of the fiber wall material.

3. The method of claim 1 in which said embrittlement is accomplished by chilling said appendages.

4. The method of claim 3 in which said chilling is achieved by introduction of a cold fluid into said first bore.

5. The method of claim 4 in which said cold fluid is introduced prior to advancing said tool into said first bore.

6. The method of claim 4 in which said cold fluid is liquid nitrogen.

7. The method of claim 4 in which said cold fluid is introduced as or with said sweep fluid.

8. The method of claim 1 in which said sweep fluid flow is caused by connecting the interior of said shank to and operating a vacuum pump.

9. The method of claim 1 in which said appendages are adhered to and softer than said body.

10. A solid body into which extends a generally cylindrical first bore, the wall surfaces of which have been trimmed, to remove one or more portions of said surface defined by appendages adhered to or integral with and extending from said body into said bore or across the mouths of one or more other bores intersecting said first bore, by a trimming method which comprises:
(1) hardening or embrittling said appendages,
(2) advancing into said bore a rotating trimming tool having a generally tubular shank and a cutting head attached to an integral with said shank, said head having a cutting edge and being adapted to
  a. convert said appendages to cuttings,
  b. permit flow of a sweep fluid into said shank, and
  c. deflect said cuttings into said flow,
(3) causing said fluid to flow into said tool and out through said shank at a sufficient velocity to carry out said cuttings.

11. A body as in claim 10 in which said appendages were adhered to and softer than said body.

12. A body as in claim 10 which is a composite of a relatively hard tubesheet resin and relatively soft hollow fibers potted therein and said appendages were flaps of the fiber wall material.

13. A body as in claim 12 wherein said method included embrittling said appendages by introducing a cold fluid into said first bore.

14. A body as in claim 10 wherein said embrittlement has been accomplished by chilling said appendages.

15. A body as in claim 14 wherein said chilling has been achieved by introduction of a cold fluid into said first bore.

16. A body as in claim 14 wherein said cold fluid has been introduced prior to advancing said tool into said first bore.

17. A body as in claim 14 wherein said cold fluid was liquid nitrogen.

18. A body as in claim 14 wherein said cold fluid was introduced as or with said sweep fluid.

* * * * *